Patented July 21, 1931

1,815,072

UNITED STATES PATENT OFFICE

MARION C. REED, OF CUYAHOGA FALLS, OHIO, ASSIGNOR TO THE B. F. GOODRICH COMPANY, OF NEW YORK, N. Y., A CORPORATION OF NEW YORK

RUBBER COMPOSITION AND METHOD OF PRESERVING RUBBER

No Drawing. Application filed April 12, 1930. Serial No. 443,923.

This invention relates to the art of preserving rubber, either in the vulcanized or unvulcanized condition, and to rubber compositions so preserved.

It is well known that rubber is subject to more or less rapid deterioration upon aging, especially when exposed to light, heat, or air. It has been proposed to treat rubber with so-called "anti-oxidants" or age-resisters for the purpose of retarding its deterioration and extending the period of its usefulness. Such previously known anti-oxidants include phenolic compounds, aromatic amino compounds, and the condensation products of aldehydes and amines.

This invention consists in treating rubber with a member of a new class of age-resistors, the said class comprising primary amino derivatives of diaryl ethers. It includes not only compounds containing one amino group, but also compounds containing two or more primary amino groups. Diaryl ethers containing an amino group on each of the aromatic nuclei, such as p,p' diamino diphenyl ether, o,o' diamino diphenyl ether, m,m' diamino di p-tolyl ether, the diamino dinaphthyl ethers, the diamino di-biphenyl ethers, etc. are particularly advantageous in the practice of this invention. However, other compounds within the class defined above may likewise be employed. For example, 2,4 diamino diphenyl ether, 3,5 diaminophenyl p-tolyl ether, p-aminophenyl naphthyl ether, o- amino p- phenyl diphenyl ether, etc. are useful in the process of this invention.

It will be understood that the above-named compounds are merely illustrative of the scope of the class, and that many other related compounds are likewise included within the definition. Any one or a mixture of several of the above-mentioned class of age-resisters may be incorporated into rubber or a rubber composition with beneficial effects on its age-resisting properties preferably from 0.2 to 5 parts by weight to 100 parts of rubber being used.

*Example 1.*—As a specific example of one embodiment of the method of this invention, a typical tire tread composition was prepared containing: blended plantation rubbers 100 parts by weight, sulfur 5.5 parts, zinc oxide 30 parts, gas black 40 parts, mineral rubber 10 parts, palm oil 5 parts, and hexamethylene tetramine 0.75 parts. This composition was divided into two parts, one of which was used as a control. To the other were added 0.95 parts of p,p' diamino diphenyl ether (½% of the weight of the composition). The compositions were thoroughly mixed, and vulcanized in a press for 45 minutes at 145° C. (294° F.) to produce an optimum cure. The rate of aging of the vulcanized compositions was determined by measuring their tensile strength and elongation before and after aging. The accelerated aging tests were carried out in the Geer aging oven, in which samples were maintained at a temperature of 70° C. (158° F.) in a constantly renewed stream of air, as well as in the Bierer-Davis bomb, in which other samples were maintained at the same temperature (70° C.) in an atmosphere of oxygen at a pressure of 300 pounds per square inch. The results are recorded in the following table, in which T indicates ultimate tensile strength in pounds per square inch and E indicates ultimate elongation in percent of original length:

*Aging tests of p,p' diamino diphenyl ether*

| Antioxidant | Before aging | | After 7 days in the Geer oven | | After 48 hours in the Bierer-Davis bomb | |
|---|---|---|---|---|---|---|
| | T | E | T | E | T | E |
| None (control) | 3350 | 630 | 1480 | 377 | 670 | 257 |
| p,p' diamino diphenyl ether | 3580 | 580 | 1830 | 307 | 860 | 237 |

*Example 2.*—A rubber composition was prepared, containing essentially 45 parts by weight of rubber, 16.45 parts of lithopone, 25 parts of inert pigments, 12 parts of zinc oxide, 1.2 parts of sulphur, and 0.35 parts of an organic accelerator. When this rubber composition was vulcanized in air at 260° F. for 2 hours, the rubber was so badly oxidized that the surface was extremely sticky, while the tensile strength was only 765 pounds per square inch and the elongation 583 per cent. When 0.5 parts of diamino diphenyl ether were added and the rubber vulcanized in exactly the same manner, the vulcanized rubber had a dry surface and was very resilient and snappy, the tensile strength being 2666 pounds per square inch and the elongation 590 per cent.

The compounds of this class, in addition to their age-resisting properties, are mild accelerators and may be employed as such in rubber stocks which are to be vulcanized at high temperatures. However, they are particularly valuable as adjuncts to certain of the more active accelerators such as diphenyl guanidine, diothotolyl thiourea, and the aldehyde-amine reaction products, and particularly the sulphur-containing accelerators such as mercapto benzothiazole, tetramethyl thiuram monosulphide or disulphide, the dithiocarbamates, etc.

Obviously, the practice of this invention is not limited to the specific compositions given above, such compositions being merely illustrative of one manner of employing the age-resisters of this invention. The proportions of the constituents may be varied, or other substances may be substituted therefor, since this invention is applicable to pure rubber or rubber compositions of the most varied nature. The age-resisters may also be applied to unvulcanized or vulcanized rubber with good effect on the age-resisting properties of the rubber, such as by applying them to the surface of the rubber, as for example in solution, or in the form of a paste or emulsion.

It is to be understood that the term "treating" as employed in the appended claims is used in a generic sense to include either the incorporation of the age-resisters into the rubber by milling or similar process, or their addition to the rubber latex before its coagulation, or to the application thereof to the surface of a mass of crude or vulcanized rubber. The term "rubber" is likewise employed in the claims in a generic sense to include caoutchouc, whether natural or synthetic, reclaimed rubber, balata, gutta percha, rubber isomers and like products, whether or not admixed with fillers, pigments, vulcanizing or accelerating agents.

While I have herein disclosed certain preferred manners of performing my invention, I do not thereby desire or intend to limit myself solely thereto, for, as hitherto stated, the precise proportions of the materials utilized may be varied and other materials having equivalent chemical properties may be employed if desired without departing from the spirit and scope of the invention as defined in the appended claims.

I claim:

1. The method of preserving rubber which comprises treating rubber with a primary amino derivative of a diaryl ether.

2. The method of preserving rubber which comprises treating rubber with a poly primary amino derivative of a diaryl ether.

3. The method of preserving rubber which comprises treating rubber with a diaryl ether containing a primary amino group substituted on each aryl group.

4. The method of preserving rubber which comprises treating rubber with a diphenyl ether containing a primary amino group substituted on each phenyl group.

5. The method of preserving rubber which comprises treating rubber with p,p′ diamino diphenyl ether.

6. The method of preserving rubber which comprises vulcanizing rubber in the presence of a diamino diaryl ether.

7. The method of preserving rubber which comprises vulcanizing a composition comprising rubber, sulphur, zinc oxide, an active organic accelerator of vulcanization, and a diamino diaryl ether.

8. A composition of matter comprising rubber and a primary amino derivative of a diaryl ether.

9. A composition of matter comprising rubber and a poly primary amino derivative of a diaryl ether.

10. A composition of matter comprising rubber and a diaryl ether containing a primary amino group substituted on each aryl group.

11. A composition of matter comprising rubber and a diphenyl ether containing a primary amino group substituted on each phenyl group.

12. A composition of matter comprising rubber and p,p′ diamino diphenyl ether.

13. A composition of matter comprising rubber which has been vulcanized in the presence of a diamino diaryl ether.

14. A composition of matter comprising rubber which has been vulcanized in the presence of sulphur, zinc oxide, an active organic accelerator of vulcanization, and a diamino diphenyl ether.

In witness whereof I have hereunto set my hand this 31st day of March, 1930.

MARION C. REED.